United States Patent [19]

Lumelsky

[11] Patent Number: 4,860,248
[45] Date of Patent: Aug. 22, 1989

[54] PIXEL SLICE PROCESSOR WITH FRAME BUFFERS GROUPED ACCORDING TO PIXEL BIT WIDTH

[75] Inventor: Leon Lumelsky, Stamford, Conn.

[73] Assignee: IBM Corporation, Armonk, N.Y.

[21] Appl. No.: 163,160

[22] Filed: Feb. 25, 1988

Related U.S. Application Data

[63] Continuation of Ser. No. 728,990, Apr. 30, 1985, abandoned.

[51] Int. Cl.⁴ .................... G06F 15/16; G06F 15/66
[52] U.S. Cl. .................................. 364/900; 364/521
[58] Field of Search .............. 364/521, 200 MS File, 364/900 MS FIle, 300; 340/747, 750, 703

[56] References Cited

U.S. PATENT DOCUMENTS

| | | | |
|---|---|---|---|
| 4,368,466 | 1/1983 | Dwire | 364/900 |
| 4,380,046 | 4/1983 | Fung | 364/200 |
| 4,395,700 | 7/1983 | McCubbrey et al. | 364/900 |
| 4,439,762 | 3/1984 | Van Vliet et al. | 340/750 |
| 4,442,503 | 4/1984 | Schütt et al. | 364/900 |
| 4,507,726 | 3/1985 | Grinberg et al. | 364/200 |

OTHER PUBLICATIONS

"Multiple Pseudo Color Lookup Tables in Raster Graphic and Image Displays" by Judd et al. *IBM Technical Disclosure Bulletin*, vol. 26, No. 7A 12/83, pp. 3409–3418.
Forward Technology "FT-1024 User's Manual", (Forward Technology, Inc., Santa Clara, CA; 1982).
"A Frame Buffer System with Enhanced Functionality", by Crow et al., *Computer Graphics*, vol. 15, No. 3, Aug. 1981, pp. 63–69.
"High Performance Raster Graphics for Microcomputer Systems"; by Bechtolsheim, et al., *Computer Graphics*, vol. 14, No. 3, 7/180, pp. 43–47.

*Primary Examiner*—Lawrence E. Anderson
*Attorney, Agent, or Firm*—Pollock, Vande Sande & Priddy

[57] ABSTRACT

A pixel processor includes a plurality of pixel slice processors and the architecture is arranged so that the pixel length is extendible by merely increasing the number of pixel slice processors. Each of the pixel slice processors is firstly interconected with other pixel slice processors, and includes a plurality of registers, gates and multiplexers for selectively presenting to a processing means data derived from a variety of sources, including a frame buffer. The output of the processing means can be stored back in the frame buffer or directed to one or more registers in the associated pixel slice processor or/and to registers in other pixel slice processors. SIMD operation is accomplished for pixel lengths which are equal to or larger than the bit capacity of the pixel slice processors. In a particular embodiment of the invention, SIMD operation is effected on pixel lengths larger than the bit capacity of the pixel slice processors. For operating on k pixels simultaneously, the pixel slice processors are grouped into n/i groups of k processors each, where i indicates the bit handling capacity for each pixel slice processor and n is the pixel length.

11 Claims, 12 Drawing Sheets

FIG. 11

CONTROL SIGNALS

| 8 | 7 | 6 | 5 | 4 | 3 | 2 | 1 | 0 | ACTIVE BUS | FUNCTION |
|---|---|---|---|---|---|---|---|---|---|---|
| 0 | 0 | X | X | X | X | X | X | X | NONE | DISABLE |
| 0 | 1 | X | X | X | J (0-F) | | | | AB | PIXEL J IS THE SOURCE |
| 1 | 0 | M (0-7) | | | X | X | X | X | EB | BITS 4M-(4M+3) OF EACH PIXEL ARE THE SOURCE |
| 1 | 1 | X | X | X | X | X | X | X | AB | WRITE ANY OR ALL PIXELS FROM THE HOST DATA BUS |

PIXEL SLICE PROCESSOR WITH FRAME BUFFERS GROUPED ACCORDING TO PIXEL BIT WIDTH

This is a continuation of co-pending application Ser. No. 728,990 filed on Apr. 30, 1985, now abandoned.

DESCRIPTION

1. Technical Field

The invention relates to an improved graphical processor which is not arbitrarily restricted in pixel length and at the same time is capable of implementing a wide variety of loadable sets of operations and handles pixel data in a variety of formats.

2. Background Art

The primary consideration in graphical applications is execution of a screen update. When a single (or host) processor handles all graphic computations, the result typically is unacceptably long execution times. Distributed processing helps resolve this problem; the graphic processor is an array of processing elements controlled by the host processor.

Prior art graphic processors have used either typically bit slice micro-programmable machines or conventional microprocessors. The prior art architectures, however, had relatively arbitrarily limited the pixel length. An improvement in this architecture was effected by incorporating arithmetic logic units (ALU) in the frame buffer data stream, see Crow et al "A Frame Buffer System with Enhanced Functionality" in *Computer Graphics*, Vol. 15, No. 3, August 1981. This hardware accelerates the read/modify/write memory operation and can be extended for any pixel length. Unfortunately the approach is not convenient for conditional computations and does not effectively handle situations wherein the address of source and destination operands are different.

The SUN workstation architecture (see Bechtolsheim et al "High Performance Raster Graphics for Microcomputer Systems" appearing in *Computer Graphics*, Vol. 14, No. 3, July 1980 and the "FT-1024 User's Manual", Forward Technology, Inc., Santa Clara, Calif., 1982) includes extra registers storing ALU operands. The workstation provides combination functions on arbitrarily addressed operands. Nevertheless, the SUN graphic processor cannot be easily rearranged for gray scale or color image modification because its architecture is directed to single bit plane format. With the SUN workstation the host processor is responsible for arithmetic conditional operations on pixel values, which is an important constraint. Both the architectures mentioned above have a constraint of predefined operation sets and pixel data format. These constraints are important. For example pixel data may contain red, green, blue and depth (Z) components of different length for some applications and represent several bit planes for others. The operation set and data format can be different depending on the particular application.

SUMMARY OF THE INVENTION

The invention overcomes these and other problems in the prior art by providing an architecture including in one embodiment an n-bit pixel slice processor or unit processor which has the following characteristics.

An ALU is implemented in the form of a random access memory (RAM). The first n address bits of the RAM represent the first operand, and the next n bits represent a second operand. Additional address bits provide for operation control. The unit processor includes a transceiver for coupling the n input/output bits of the RAM to a latch LA. The particular functions to be implemented by the ALU are represented as a function table which is loaded into the RAM from data lines through the transceiver, and thus the transceiver is bi-directional.

The output data residing in the latch LA can be written into a frame buffer (FB) or put on a PSP bus using a second or bus transceiver (BT). The FB and LA data can also be loaded into a source mask register (SMR), a source register (SR), a destination mask register (DMR) and a destination register (DR). By controlling the data flow direction through BT, the PSP bus can be used to load the FB or one or more of the four registers specified above.

The SR, SMR, DR and DMR registers serve as either a store of source and destination data or as a condition code. In the latter case a logical AND of the SR and SMR data is implemented by a SAND gate and correspondingly the logical AND of the DR and DMR data is provided by a DAND gate.

A source multiplexer (SM) selects one of its four n-bit inputs as an operand for the ALU. Thus, one operand for the ALU can be chosen among SR, SMR, SAND and either the LA or FB data. Because the LA output is also connected to the PSP bus (through BT), the PSP data bus can also be used as an ALU operand so as to provide data communication between cascaded pixel slice or unit processors. The destination multiplexer (DM) similarly selects between DMR, DR, DAND, LA, FB or the PSP bus to provide the other operand for the ALU.

Control signals from a microprogrammed control enable clocking input of the corresponding devices (providing the ability of pipeline data flow as well).

Since unit processors can communicate on the PSP bus, the number of unit processors can be changed, if necessary, to accommodate larger pixel lengths. Accordingly, pixels with lengths greater than n can be processed.

Thus in accordance with one embodiment, the invention provides a pixel processor with extendable bit length comprising:

a plurality of unit processors, first conducting means connected to all said unit processors, a control memory with at least two groups of outputs, a first group of outputs commonly connected to all said unit processors and a second group of outputs uniquely connected to different ones of said unit processors, a frame buffer with a bidirectional data path to/from each of said unit processors, each said unit processor including:

first and second operand registers of bit length n, an n-bit processing unit with an input for each of said operand registers for processing data derived from said operand registers to produce n-bit output data, a data latch responsive to the n-bit output data of said processing means, and connecting means coupling said latch to said frame buffer and to said first conducting means, whereby extensions of pixel length are accommodated by adding an additional unit processor for each extension of pixel length of n bits or less.

In another embodiment of the invention, the pixel slice processor need not be capable of processing data as wide as the pixel length. Rather, a group of pixel slice processors are used selectively to handle each pixel. At the same time, however, execution is not limited to a single pixel, e.g. single instruction, multiple data (SIMD) processing is employed. This is effected, for an n-bit pixel, by using n frame buffer planes. Multiple data stream processing is provided by selecting each frame buffer plane to provide a k-bit word, so as to allow the processing of k pixels simultaneously. The pixel slice processors are each capable of processing i bits of data (where n, k and i are independent integers each greater than 1 and i is less than or equal to n). The n frame buffer planes are divided into a plurality of groups, wherein each group of frame buffer planes includes i planes. Similarly, the pixel slice processors are grouped, so that there is a group of pixel slice processors for each group of frame buffer planes. Since each of the pixel slice processors can simultaneously process data i bits in width, there are k pixel slice processors per group. In order to overcome the prior art problems in operating with pixels whose length is greater than the processing capability of a single processor, we provide for intrapixel carries via a data path interconnecting pixel slice processors in different groups. On the other hand, in order to avoid prior art problems in providing for conditional computations, we provide a data path for communicating between the pixel slice processors in a group. In this embodiment the invention provides for:

a graphic processor for single instruction multiple data operations on k pixels simultaneously, where k is an integer greater than 1, which processor is also easily expandable in terms of pixel length and can efficiently handle conditional operations requiring efficient interpixel communications, comprising:

a plurality of n frame buffers, each buffer storing data of k-bit width, said plurality of frame buffers arranged in groups of i frame buffers per group, where n and i are each independent integers greater than 1 and i is an integer less than or equal to n, to provide n/i groups of frame buffers, a plurality of pixel slice processors, each operating on data of i bit width, said plurality of pixel processors arranged in n/i groups of k processors per group, where each frame buffer group has a corresponding pixel slice processor group, data path means to provide for bidirectional data flow within a group between said frame buffers and said pixel slice processors, for data flow between pixel slice processors of a group and for data flow between corresponding pixel slice processors of different groups, whereby computations requiring intrapixel carries or interpixel communications are provided for on said data path means and extensions of pixel length are handled by increases in the integer n.

For efficiently implementing the invention in accordance with this embodiment, each group of pixel slice processors can be located on a different circuit board and therefore a data path providing communications between the pixel slice processors in a group, is located wholly within a single circuit board. A bus is provided for intrapixel communication, coupling the different circuit boards. The intrapixel bus need only as many conductor groups as there are pixels being processed simultaneously, k. There are i conductors per group so the intrapixel bus requires a total of k * i conductors. Since the interboard bus is not related to n (the bit length of the pixel) extensions of the pixel length being handled merely require adding an additional circuit board or boards. Thus this aspect of the invention provides apparatus such as recited above which includes:

a plurality of circuit boards, one for each group, in which each of said groups of pixel slice processors are located on a different one of said circuit boards, and an interboard bus to provide that portion of said data path means for data flow between corresponding pixel slice processors of different groups.

BRIEF DESCRIPTION OF THE DRAWINGS

The present invention will now be further described in the following portion of the specification when taken in conjunction with the attached drawings in which:

FIG. 11 is a table illustrating control signals used in implementing the communication network shown in block diagram in FIG. 10;

DETAILED DESCRIPTION OF THE PREFERRED EMBODIMENTS

Figure 1:
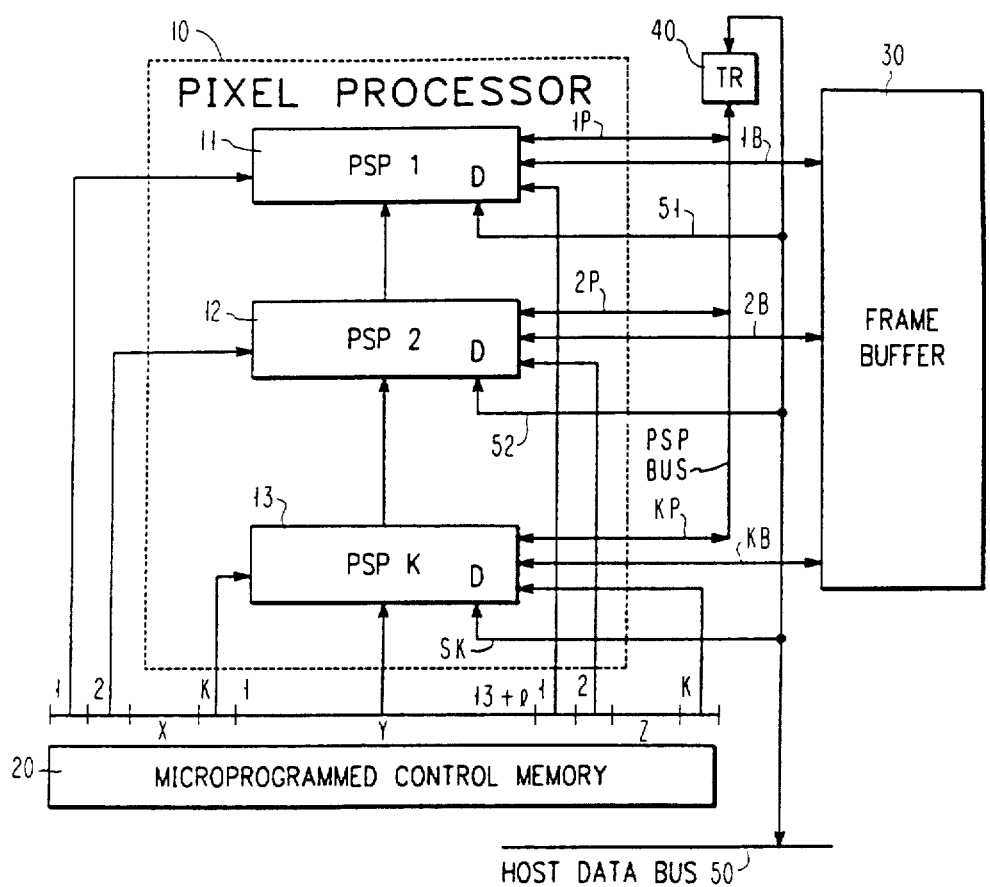
FIG. 1 is a block diagram of a pixel processor architecture in accordance with one embodiment of the invention.

FIG. 1 is a block diagram of the pixel processor 10 constructed in accordance with the invention. FIG. 1 shows the processor 10 in association with a frame buffer 30, a microprogram control memory 20, transceiver 40 and host data bus 50. The pixel processor 10 includes a number of PSP (or unit) processors, FIG. 1 shows pixel slice processor 11 (PSP1), PSP2 (12), through PSP k(13). In the embodiment of FIG. 1, each PSP processor handles data in units of n bits, the pixel length may be larger than n as will be described. The number of unit processors is arbitrary, and its selection will depend on the chosen pixel length and the bit capacity (n) of each of the unit processors. For example, for a 32-bit pixel, four unit processors, each handling eight bits would suffice. On the other hand, the pixel processor architecture is capable of simultaneously handling multiple pixels. Thus for example with an 8-bit pixel, four unit processors, each of 8-bit width, could simultaneously process four pixels.

Each unit processor has a dedicated bi-directional data path to/from the frame buffer 30. Thus processor 11 has dedicated path 1B, processor 12 has dedicated path 2B and processor 13 has dedicated path KB.

The transceiver 40 also provides a bi-directional data path connecting each of the unit processors to the host data bus 50. A PSP bus is connected to each of the unit processors via paths 1P-KP, and the PSP bus is connected to transceiver 40. Each of the unit processors is also capable of accepting or transmitting data to the host data bus 50 via the paths 51, 52, . . . 5K.

The microprogram control memory 20 is coupled to each of the unit processors. The control signals provided by the microprogram memory 20 can be broken down into a first group of control signals which are coupled in common to all the unit processors, e.g. a Y group of control signals including individual signals Y1-Y(13+L). A second group of control signals provided by the microprogram control memory 20 is uniquely coupled to different ones of the unit processors. This group of control signals includes X and Z control signals wherein a control signal in each group is coupled to one and only one unit processor. Thus signals X1 and Z1 are coupled to unit processor 11, X2 and Z2 are coupled to unit processor 12, and XK and ZK are coupled only to unit processor 13.

Figure 2A:
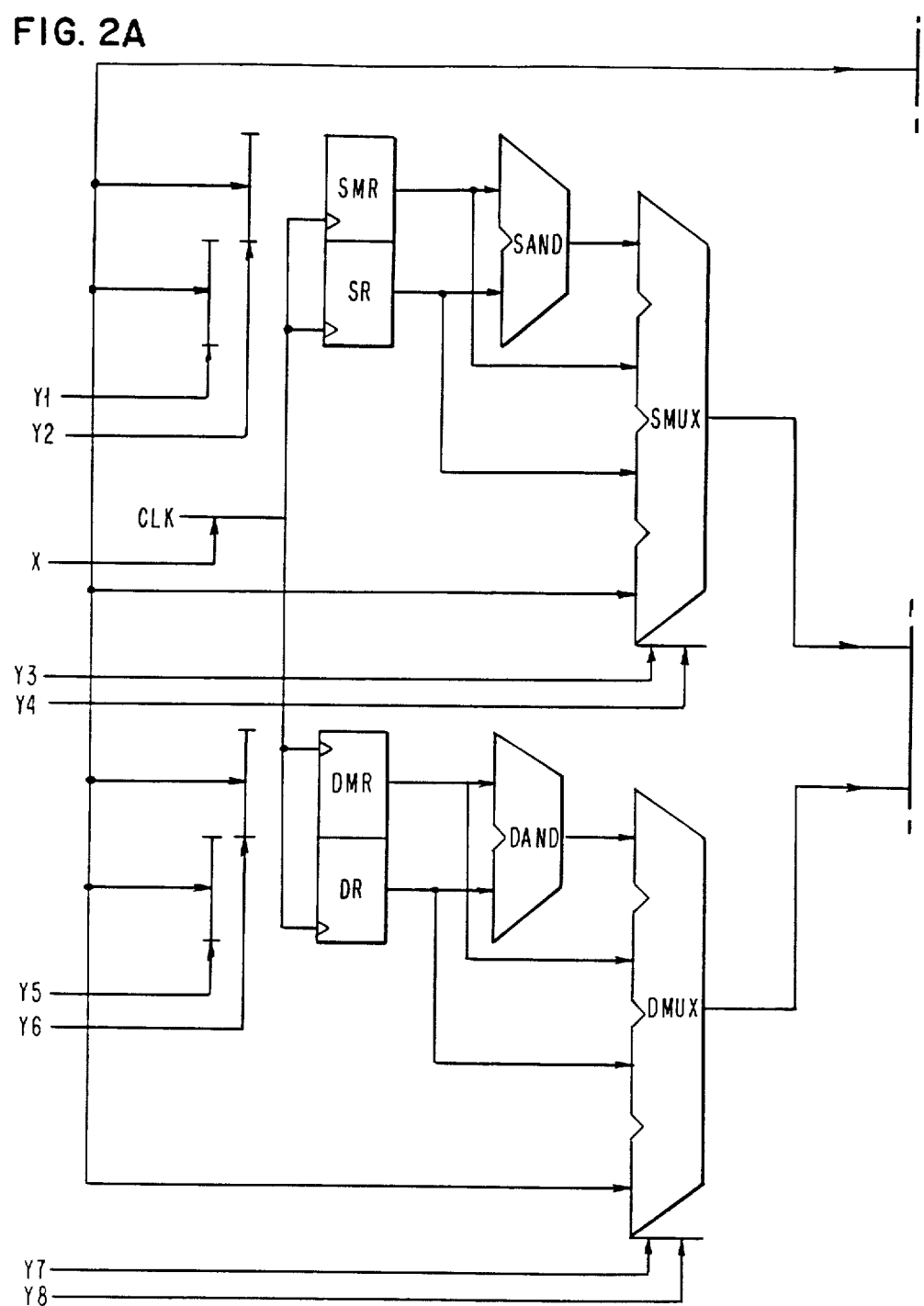
FIG. 2 is a detailed block diagram of a typical pixel slice processor included in the block diagram of FIG. 1.
Figure 2B:
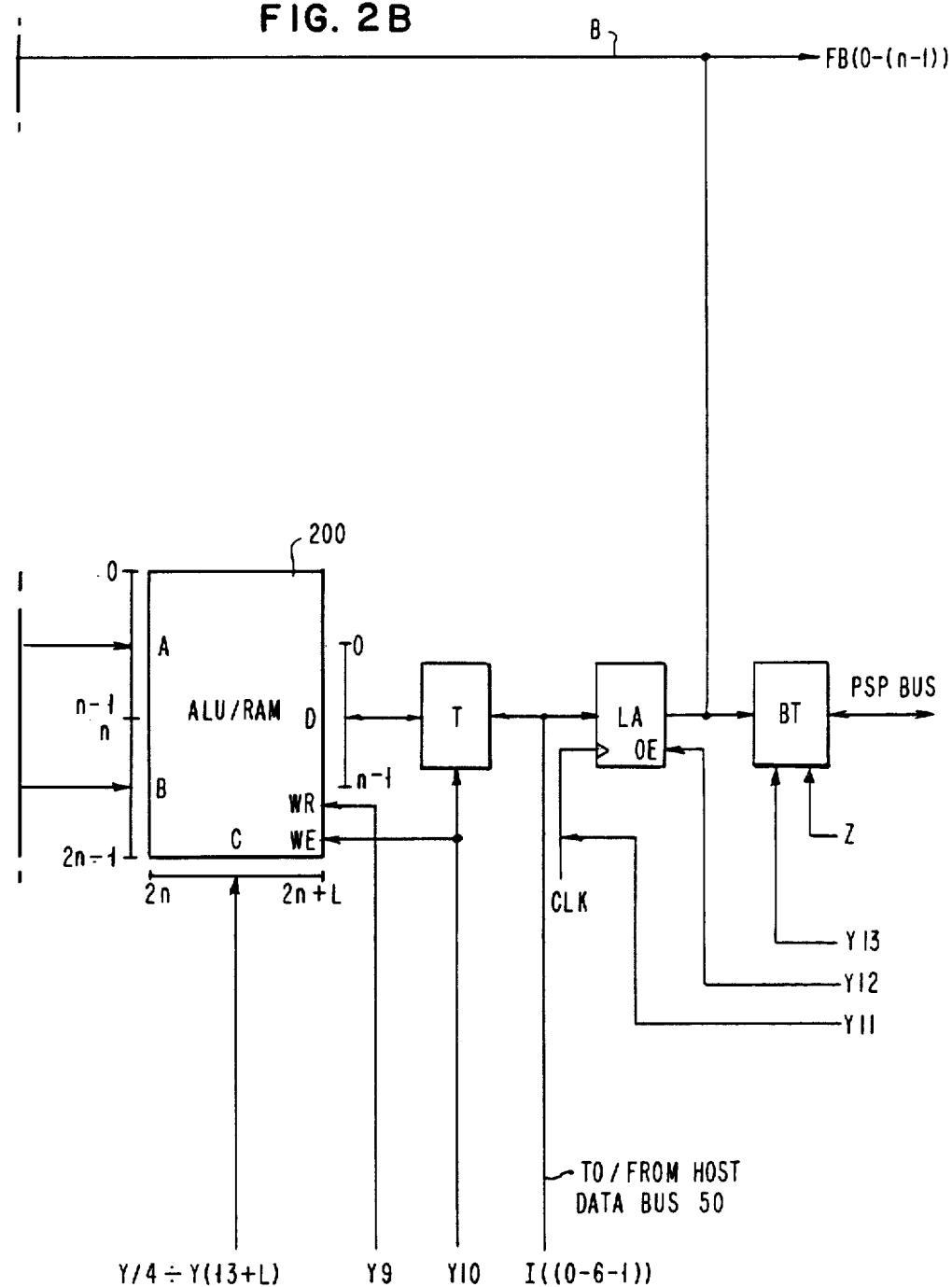

FIG. 2 is a block diagram of a typical unit processor. The ALU function is implemented in the form of a RAM 200. RAM 200 is coupled to three data input paths, at the ports 200A, 200B and 200C, and one input/output path at the port 200D. The input port 200A is coupled over an n-bit path to the output of a source multiplexer SMUX. SMUX has four different n-bit inputs, and control signals Y3 and Y4 determine which of the four inputs is effective. A first input is provided by the output of the SAND gate. The SAND gate has two n-bit inputs, a first derived from an n-bit register SMR, and a second derived from an n-bit register SR. Two of the other three inputs of SMUX are provided respectively by the outputs of the registers SMR and SR, directly. The fourth input to the SMUX multiplexer is provided by the B bus which is the unit processor's dedicated bi-directional path to the frame buffer 30. The input to the SMR and SR registers is also provided by the B bus and gated respectively by control signals Y2 and Y1.

The data path coupled to the input port 200B is derived from a similar destination arrangement. More particularly, the input port 200B is coupled to the output of a destination multiplexer DMUX which has four n-bit inputs. A first input is provided by the gate DAND. Inputs to the gate DAND are provided by registers DMR and DR, which also provide two of the other three inputs to the DMUX. The fourth input to the DMUX is derived from the B bus, and control signals Y7 and Y8 select the effective input to DMUX. The input to the registers DMR and DR respectively are also provided by the B bus gated by control signals Y5 and Y6. The X control signal clocks the registers SMR, SR, DMR and DR.

The input port 200C, which is L bits wide, is provided in common to all unit processors by the control signals Y14—Y(13+L). The input/output port 200D is also n bits wide and is coupled to a transceiver T. The direction of data flow through the transceiver T is controlled by the common control signal Y10, which also controls the RAM 200 data direction. That input/output port of transceiver T, not connected to the RAM 200, is coupled to the input of a latch LA and also to the host data bus 50. The output of the latch LA is coupled to a bi-directional transceiver BT and to the frame buffer bus B. The latch LA is clocked by the common control signal Y11 and enabled by the common control signal Y12. The other input/output of the bidirectional transceiver BT is coupled to the PSP directional transceiver BT is controlled by the unique control signal Z, and the transceiver is enabled by the common control signal Y13.

In view of the foregoing it should be apparent that the output data of any unit processor can be transmitted selectively to other unit processors, so that for example only selected SR, SMR, DR and DMR registers will be loaded with the data from the PSP bus. As an example, if Z2, X1, XK, Y2 and Y6 are active, the ALU output data from the RAM 200 of the unit processor 2 (control signal Z2) will be loaded into the SMR (control signal Y2) and DMR (control signal Y6) registers of the unit processors 1 (control signal X1) and K (control signal XK).

The contents of the RAM 200 can be written from the host processor data bus 50. Upper address bits are provided by the control signals Y14—Y(13+L) and lower address bits are loaded as ALU operands into a pair of registers in each unit processor, SR and DR (for example).

The registers SR, SMR, DR and DMR can be loaded from the host processor data bus 50 through the transceiver 40 which provides an output on the PSP bus. The same data path is used for reading or writing the frame buffer 30 by the host. This accommodates the fact that the host data bus length can be shorter than the pixel and thus several cycles would be needed for the data transfer between the host and frame buffer or pixel processor. On the other hand, a memory clear of the frame buffer can be effected simultaneously by making all the bi-directional transceivers BT operate to receive zero (or null) data from the host through the PSP bus.

Figure 3:
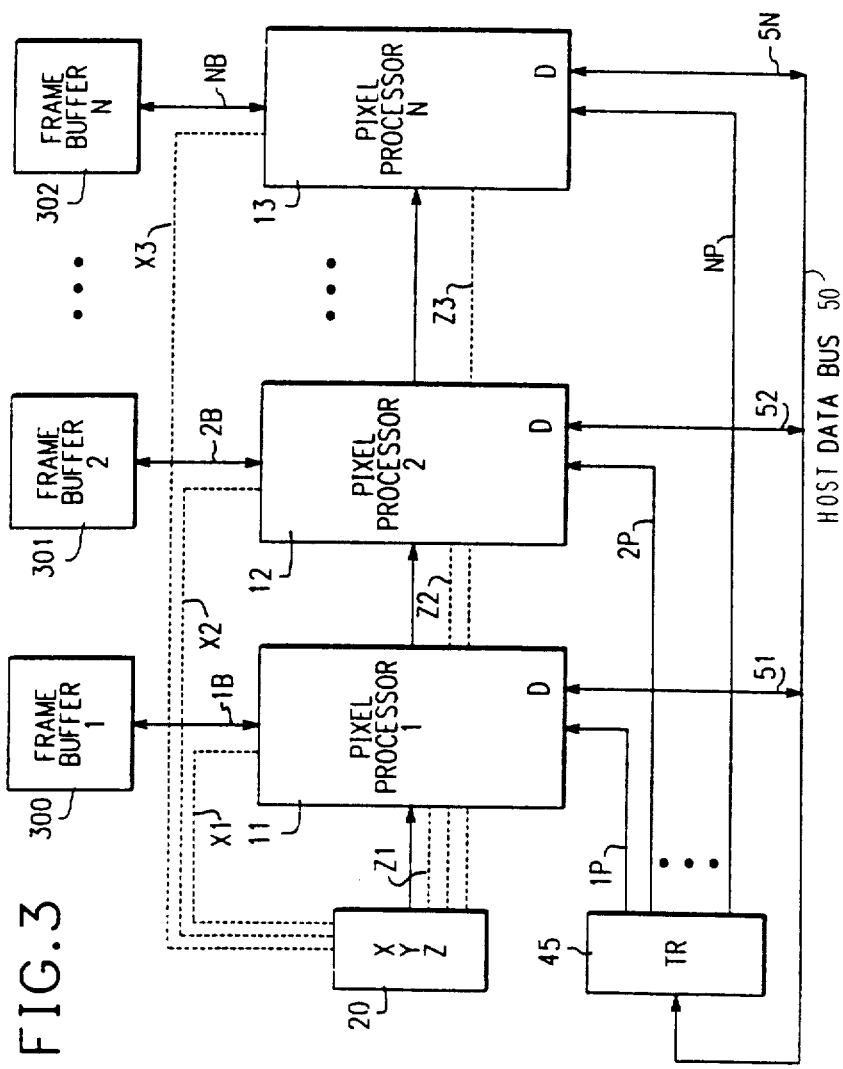
FIG. 3 is an alternative block diagram for a pixel processor in accordance with the first embodiment of the present invention.

Concatenated operation of the several unit processors as shown for example in FIG. 1 is not the only mode of operation of the pixel processor. Rather the several unit processors can be operated in parallel so as to handle multiple pixels, simultaneously. In this event the connectivity of the pixel processor is shown in FIG. 3. FIG. 3 shows that each of the unit processors 11-13 are coupled over their dedicated bi-directional frame buffer paths 1B-NB to different frame buffers 300-302, although frame buffers 300-302 may be different portions of the same frame buffer 30. Each unit processor 11-13 is coupled to the host data bus 50 over the same path 51-5N. The connectivity of the microprogram control memory 20 is slightly altered. As was the case with FIG. 1, the Y control signals are coupled in common to all unit processors 11-13. Different from FIG. 1 is the fact that the X and Z control signals can be common to all unit processors 11-13. Also different from FIG. 1 is the form of a PSP bus. Whereas in FIG. 1 the PSP bus was commonly connected between an input/output of the transceiver BT and all unit processors, as shown in FIG. 3, the input/output of the transceiver BT is coupled over paths 1P-NP, each dedicated to a different unit processor, to the transceiver 45, and through the transceiver 45 to the host data bus 50.

As an alternative to changing the connectivity between the microprogram control memory 20 and the unit processors 11-13 when going from the arrangement of FIG. 1 to FIG. 3, the connectivity can remain as in FIG. 1, but the contents of the microprogram control memory 20 is arranged such that each of the X control signals (X1-XK) are identical, and similarly, each of the Z control signals (Z1-ZK) would be identical. This alternative is illustrated in FIG. 3 by the dotted conductors X1-X3 and Z1-Z3.

Figure 4:
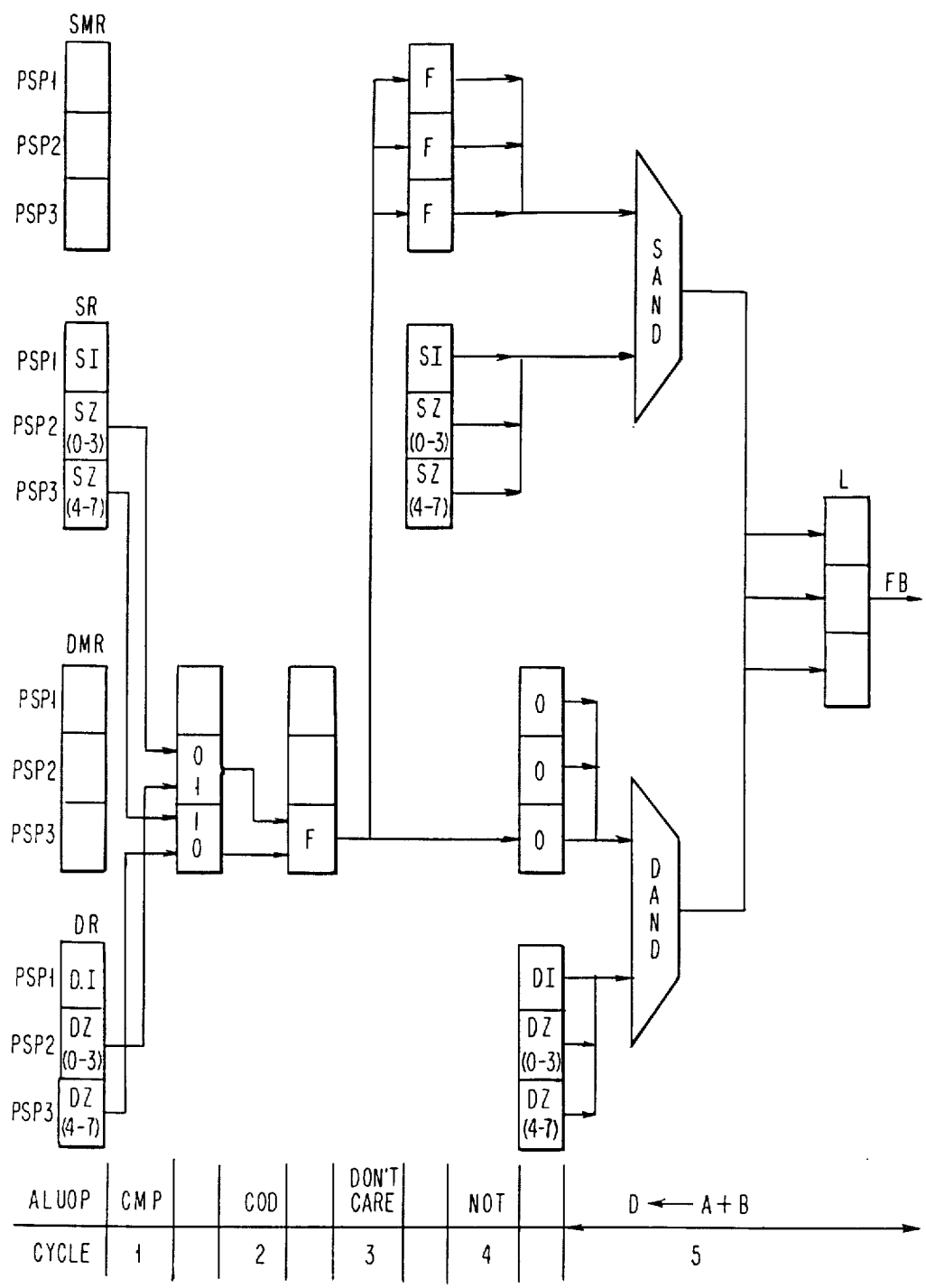
FIGS. 4-6 illustrate data flow for three different computational algorithms efficiently implemented in accordance with the first embodiment of the invention.

FIG. 4 is an illustration of how the pixel slice processor of the invention can implement the Z buffer algorithm which has been applied in three dimensional computer graphics for hidden surface elimination. Using the Z buffer algorithm, one pixel value (S or D) can be overwritten by the other pixel value (D or S) if its corresponding depth (D.Z or S.Z) is greater than the other depth. More formally stated:

IF (S.Z > D.Z) THEN D ELSE S.

In describing the example we will assume that each unit processor is four bits wide (n=4) and there are three unit processors (K=3), that is a 12-bit processor is built using three 4-bit unit processors. The 12-bit pixel has four bits of intensity (bits 0-3) and eight bits of depth information (bits 4-11). FIG. 4 is used to illustrate execution of the algorithm using the pixel processor of the invention. The figure shows, at the left, SMR, SR, DMR and DR registers of the three processors used to implement execution of the algorithm; for ease of explanation all common registers across the three processors are grouped together. Thus the block at the upper left-hand corner of FIG. 4 shows the three SMR registers of processors 11, 12 and 13, one directly below the other. The time axis to illustrate the process is horizontal, time progressing from left to right. Where significant information changes occur in the contents of one or more of the registers, the registers are reproduced and the source of the new information is reproduced. Identification of the registers is simplified by maintaining their vertical position, such that the three SMR registers are depicted as the top row of the figure, the three SR registers are the second row, the three DMR registers the third row and the DR registers are the fourth and last row. The time axis is divided into five logical cycles, and an operation code (ALUOP) is assigned to each of the five cycles. The logical cycle may take one or more clock cycles for execution. We assume at the initiation of the process data corresponding to a source pixel is written into the SR register of the three processors, and data corresponding to another pixel (a destination pixel) is written into the DR registers of the three unit processors. The low order four bits are written into unit processor 11 and represent intensity information. The next four bits represent the low order depth information and are written into unit processor 12. The high order four bits represent high order depth information and are written into unit processor 13.

In the first cycle (CMP), a comparison is effected in unit processor 2 of the low order depth information from both source and destination pixels. Simultaneously the high order depth information is compared in the ALU of unit processor 3. Each comparison produces one of three results, 00 for equality, 01 if DR > SR and 10 if DR < SR. These three possibilities require only two bits, the other two bits may remain null (the upper two bits, for example). This leaves 0000, 0001 or 0010 in the latches LA of unit processors 2 and 3. The results are written back to the DMR registers of processor 2 and 3. With the two resulting operands from the two comparison operations now available, they are used at the third processor. The second logical cycle is a nonstandard graphical operation wherein the effective four bits of the two result operands are used to address the RAM 200 of processor 13. More particularly, data from the DMR register of PSP3 and data from the latch LA of PSP2 (transferred by the PSP bus to BT of PSP3, the bus B and SMUX) are applied to RAM 200 of PSP3 to produce a resulting byte which is 0 if S.Z is greater than D.Z or F otherwise. The result is loaded back into the DMR register in processor 3. That concludes the second logical cycle.

The third logical cycle is merely a transfer from the DMR register of processor 13 to the SMR register of each of the processors. That concludes the third logical cycle. At this time the result of the comparison is located both in the DMR register of processor 13 as well as the SMR register of each of the processors.

The fourth logical cycle is a NOT function performed, at processor 13, on the contents of the DMR register. The result of the NOT operation is written into the DMR register of each of the three processors. At this point in time, if the source depth was not greater than the destination depth, then as shown in FIG. 4, this is indicated by the quantity F(hex) in the SMR register of each processor and the quantity 0 (as a result of the NOT operation) in the DMR register of each of the three processors. On the other hand, if the source depth was greater than the destination depth, then the result produced in the third cycle would not be as shown in FIG. 4 but instead would be a 0. This 0 would have been transferred and appear in each of the SMR registers whereas the quantity in the DMR register in each processor would not be 0, but would be F(hex). This is the conclusion of the fourth logical cycle and sets the stage for the fifth logical cycle which produces the desired result.

The fifth logical cycle is effected in each of the three processors and employs as the input to the port 200A of each RAM 200 the SAND output (logical AND of the SR and SMR register contents) and input to the port 200B is the DAND output (the logical AND of the contents of DR and DMR). If as shown in FIG. 4 the source depth is not greater than the destination depth, then the desired result is the source pixel. This is the result produced in the SAND which is provided to the port 200A of each RAM 200. The output of the DAND register is 0 (since one of the inputs to the DAND gate is the 0 contents of the DMR register). The result from the RAM 200 is the source pixel which is then loaded into the latch LA (four bits in each processor) and then transferred to the frame buffer. On the other hand, if the source depth was greater than the destination depth, then the DMR registers would contain the quantity F(hex) and the SMR register would contain the quantity 0. Accordingly, the output of the SAND gate would be 0 and the output of the DAND gate would be the D pixel and thus the resulting data in the latch LA would be the D pixel which is then transferred to the frame buffer.

Implementation of the Z buffer algorithm as shown in FIG. 4 is not limited to eight bits of depth data. Rather, for depth data greater than eight bits, several sequential CMP-COD cycles are concatenated to produce a single result, again in the DMR register, which is then used as shown in logical cycles 3, 4 and 5 of FIG. 4.

Figure 5:
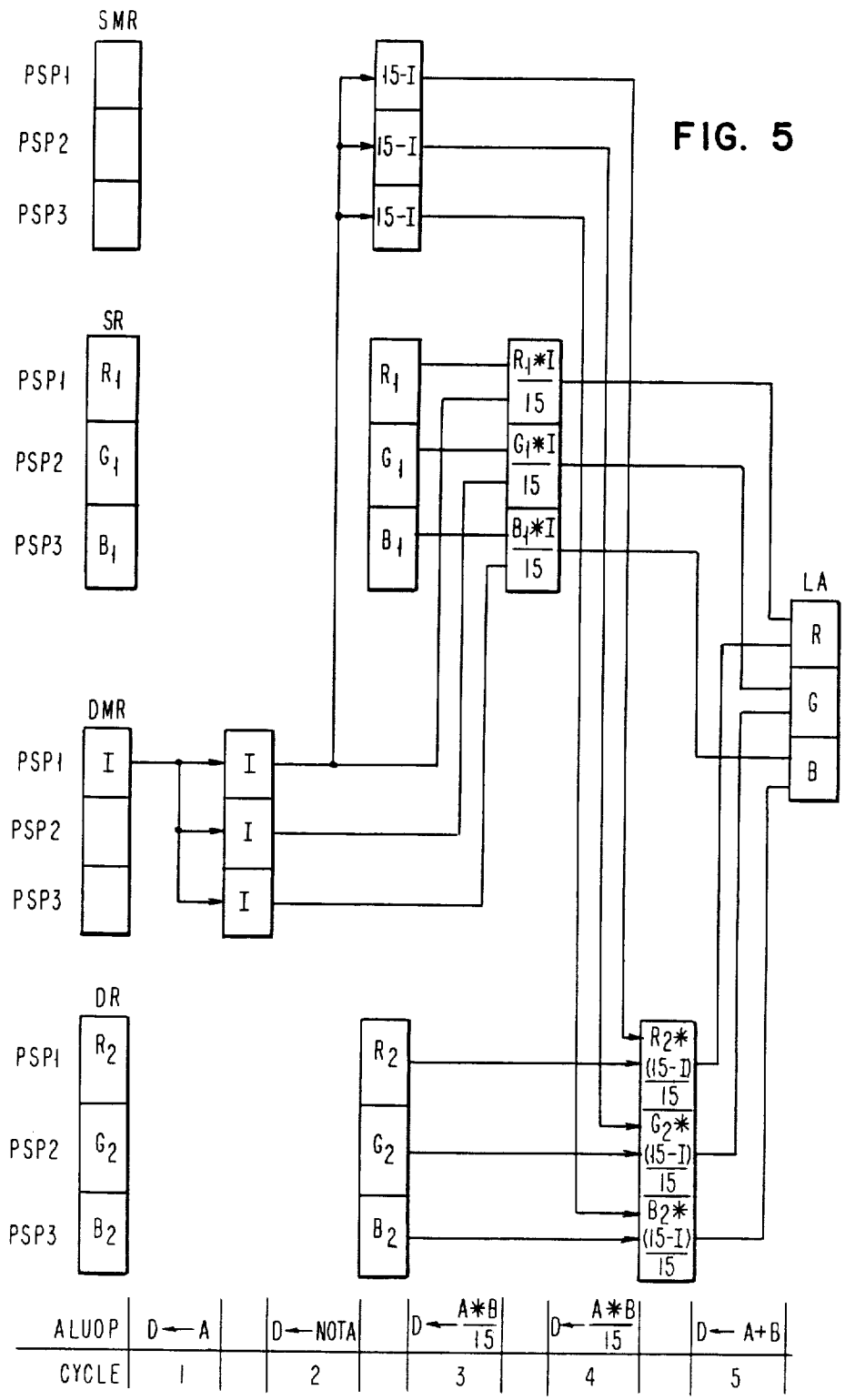

FIG. 5 is a similar diagram used to represent a copy operation with anti-aliasing. The problem in graphical processing variously called "jaggies" or "staircasing" has a number of different solutions.

In one solution a prefiltered source image is stored in the cache part of the frame buffer or host memory and then directly copied into the visible portion of the frame buffer. The intermediate gray scale levels of the intensity cannot be used directly for color images because they depend on the foreground and background colors chosen for the destination image. If a RGB color model is adopted, the color intensities can be calculated based on the source intensity I, foreground colors R1, G1 and B1 and background colors R2, G2 and B2. If we again assume a 12-bit pixel value with four bits for each of the RGB components, and the intensity (I) varying from 0 to 15 (another four bits). The red component R of the destination pixel can be calculated as:

$$R = R1*I/15 + R2*(15-I)/15. \quad (1)$$

The green (G) and blue (B) components are calculated in the same fashion.

Implementation of this algorithm is illustrated in FIG. 5 using the same convention, e.g. the SMR, SR, DMR and DR registers of the three processors (PSP 1-3) are illustrated adjacent each other. The logical cycles of this process are shown horizontally extending from left to right. As information in the various registers changes, the register is reproduced (without changing its vertical position) and the new information as well as the source of that information is represented. To initiate execution of the algorithm, the R1, G1 and B1 foreground data is loaded into the SR registers of the three processors, the R2, G2 and B2 background data is loaded into the DR registers, and the intensity I is loaded into the DMR register of PSP 1.

In the first logical cycle, the intensity data I is copied into all DMR registers. Referring briefly to FIG. 2, we enable Y7 and Y8 control signals so that the DMUX selects as its input the output of the DMR register. This will provide an effective input for the port 200B of the RAM 200 in PSP 1, in PSP 2-3 the input will be blank as the DMR register in these processors is empty. We can enable control signals Y3, Y4 so as to select the output of the SMR register to provide input to the port 200A of the RAM 200. This is null information and the RAM 200 is arranged to copy the port 200B under these circumstances to the latch LA. We enable the BT transceiver in PSP 1 to place the contents of the latch LA on the PSP bus. We do not clock the registers in PSP 1 and thus they remain unchanged. We do clock the registers in the PSP 2 and PSP 3 processors and enable their BT transceivers to place the contents of the PSP bus on the B bus and enable control signal Y6 so that in PSP 2 and PSP 3 the contents of the B bus are loaded in the DMR register. Although Y6 is common to PSP 1, the lack of clocking PSP 1 will prevent it from responding to the Y6 control signal. Thus we have copied the intensity data I into the DMR register of each of PSP 1-3. That concludes the first logical cycle.

The second logical cycle executes a NOT function in each processor using the DMR data, the results of the NOT operation being placed in the SMR register. Thus at the conclusion of the second logical cycle, the DMR registers in each of PSP 1-3 include the I intensity, and the SMR registers in each of PSP 1-3 include the quantity 15−I (the complement of I).

In logical cycle 3, each RAM/200 is controlled to effect the operation (A * B)/15 using the SR and DMR registers as the sources for the ports 200A and 200B, respectively. The result is placed back into the SR register, so that at the conclusion of the third logical cycle the SR register of PSP 1 has instead of R1, the quantity (R1 * I)/15, the PSP 2 SR register has the quantity (G1 * I)/15, and the PSP 3 register SR has the quantity (B1 * I)/15.

In logical cycle 4 the same operation is performed using the SMR and DR data. Thus the DR register on PSP 1, at the conclusion has the quantity [R2 * (15−I)]/15, the DR register in PSP 2 has the quantity [G2 * (15−I)]/15 and the PSP 3 register DR has the quantity [B2 * (15−I)]/15. This concludes the fourth logical cycle and sets the stage for the fifth and final cycle.

In the fifth and final cycle, each of the processors effects the sum of the contents in their SR and DR registers. The result is loaded into the latch LA in each processor and from there coupled to the destination location in the frame buffer. It should be apparent that the latch LA in each processor holds data representing the expression (1).

Figure 6:
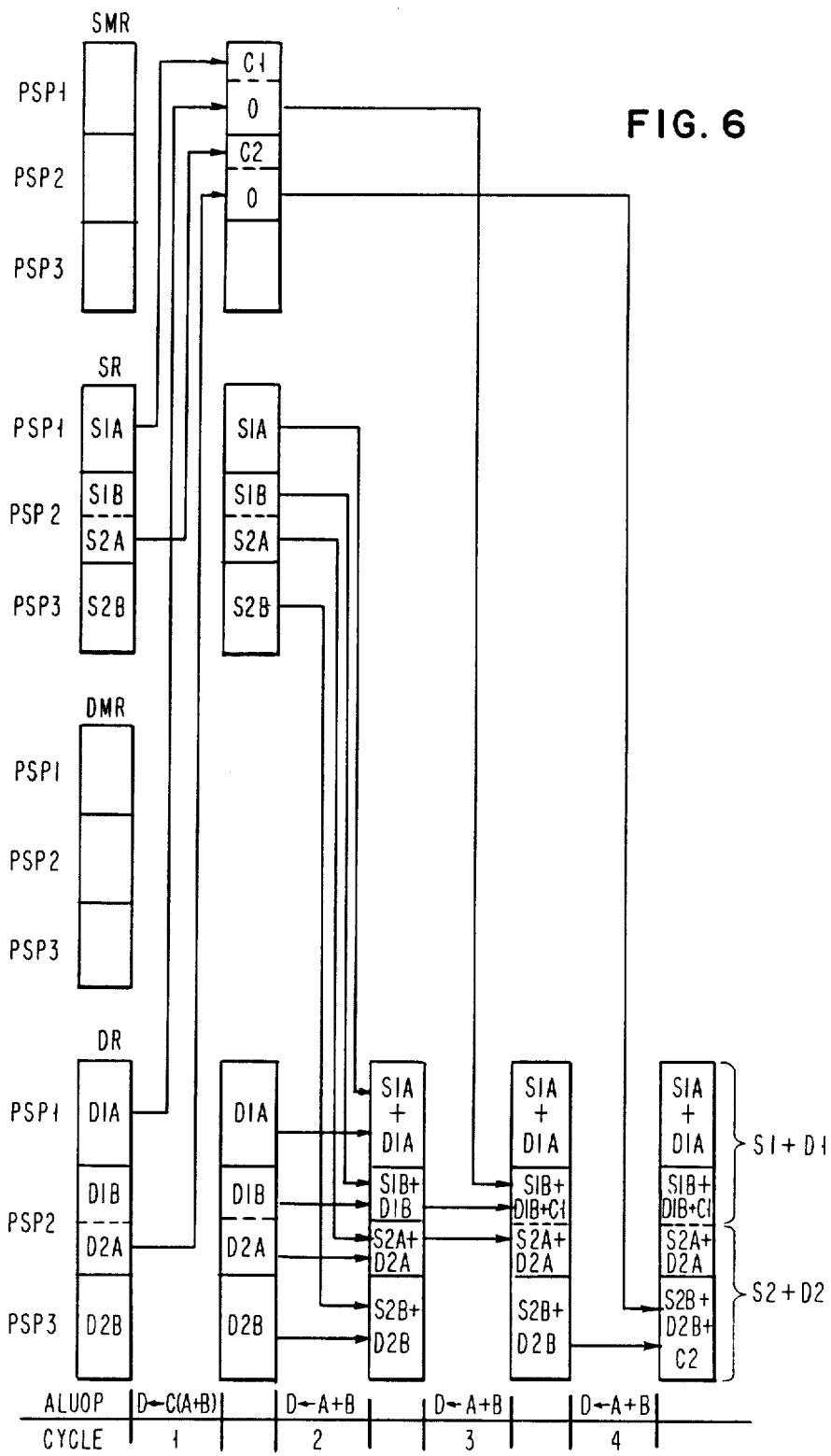

Finally, the last example is an example of a general arithmetic operation on data which is not aligned with the PSP word boundaries as those boundaries were chosen for an example such as one of the two described above. FIG. 6 is set up as was FIGS. 4 and 5 in that all like registers of the different processors (PSP 1-3) are shown adjacent each other, time progresses horizontally left to right and where information in a register changes significantly, the register is reproduced in the same vertical position and the source of the changed information is explicitly shown. As shown in FIG. 6, the contents of the SR register includes some S1 data, partially in the SR register of PSP 1, and partially in a register in PSP 2 (specifically PSP 1 includes the lower bits of the S1 data, S1A, whereas a portion of the SR register in PSP 2 contains the upper bits, S1B). The SR register in PSP 2 also includes the lower bits of S2 data, S2A, whereas the SR register in PSP 3 includes the upper bits of S2 data, S2B. The DR register holds corresponding destination data in the same format. The desire is to add S1 and D1 data and S2 and D2 data; the result is achieved in four sequential logical cycles.

In the first logical cycle, the RAM 200 of PSP 1 performs a sum of S1A and D1A, but retains solely the carry bit (C1) which is stored in the SMR register in necessarily the high bit position. The same operation occurs in PSP 2 using the high order bits of S2A and D2A. The contents of RAM 200 in effect ignore S1B and D1B in this operation. The carry bit of this operation is stored in the SMR register of PSP 2 and again necessarily in the high bit position. That concludes logical cycle 1.

In logical cycle 2 each of the RAMs 200 perform a sum of the SR and the DR registers, placing the result in the DR register. Thus in PSP 1 the result is the sum (S1A+D1A), no carry, in the PSP 3 operation we produce the sum (S2B+D2B), again no carry, and in the PSP 2 processor we produce the sum (S1B+D1B), in a subfield of the register, and in the other subfield of the register we produce the sum (S2A+D2A), again no carry. Since there are no carries in this operation, the number of output bits, and hence the subfield of the DR register which is occupied by the sum is identical to the inputs and therefore there is no overlap between the data. Necessarily the programming of the RAM 200 is specific to the operation carried out in PSP 2 and therefore different from the operation in PSP 1 and PSP 3. That concludes logical cycle 2.

In logical cycle 3 operation occurs only in the PSP 2 processor. In this processor we sum the contents of the DR register with the SMR register in PSP 1. This provides us with the true result of S1+D1 since it takes into account the carry bit which has been derived from the SMR register in PSP 1. This concludes logical cycle 3. If necessary the sum D1+S1 can be tested for a carry bit which can be stored elsewhere. Alternatively, the field length is fixed and so a carry is either superfluous or the result of a programmer's error.

Figure 12:
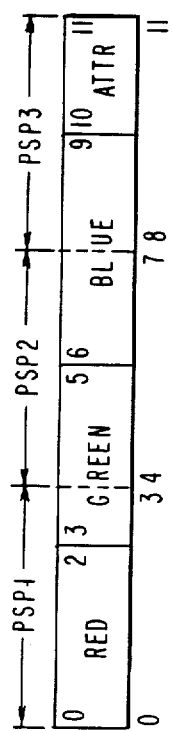
FIG. 12 shows a typical pixel where field boundaries do not match PSP bit widths.

Logical cycle 4 occurs solely in the PSP 3 processor wherein the contents of the DR register are summed with the contents of the SMR register from PSP 2 (with the carry bit from the sum of S2A+D2A). As a result, the DR register now contains, in PSP 1, the low order bits of the sum S1+D1 (specifically S1A+D1A). The DR register in PSP 2 has two subfields. One subfield includes the high order bits of the summation of S1+D1 (specifically S1B+D1B+C1). In the other subfield of the DR register we have the summation of the low order bits of S2+D2 (specifically S2A+D2A). And finally in the DR register in PSP 3 we have the sum of the high order bits of S2+D2 (specifically S2B+D2B+C2). With the contents of the DR register as stated at the conclusion of logical cycle 4, the DR register in the three processors can be gated through their associated RAM 200 into the respective latches LA, and from the respective latches LA to the frame buffer. It should be noted that the data boundary in the result is identical to the data boundary in the initial data. In addition, note that the SMR register in PSP 3 and the DMR register in each of the processors is unused. Accordingly, up to three arbitrary boundaries between data components can be easily handled by the three PSPs. More particularly, assume FIG. 12 shows the information distribution in a pixel, a 3-bit red field (bits 0–2), a 3-bit green field (bits 3–5), a 4-bit blue field (bits 6–9) and a 2-bit attribute field (bits 10, 11). The PSPs as we have assumed handle four bits, so the dotted lines in FIG. 12 show the pixel slices handled by PSP 1–3. Note the field boundaries do not match the PSP boundaries. Nevertheless, using the techniques explained with reference to FIG. 6, we can overcome this problem. This may be significant for most color graphic applications. If the pixel data format is more complicated or there are more boundaries than the number of PSPs, the situation can be handled but it becomes more complicated.

FIGS. 1 and 3 respectively illustrate a pixel processor wherein the connectivity between pixel slice processors was changed so as to either process a pixel of length larger than the processing capability of each of the pixel slice processors (FIG. 1) or else to simultaneously process a number of pixels, wherein the pixel length was equal to the capacity of each pixel slice processor (FIG. 3). However, the invention is not so limited, and can instead provide for SIMD processing (parallel processing) of pixels even though the pixel length exceeds the bit capacity of each of the pixel slice processors. This is the subject of a second embodiment of the invention illustrated in FIGS. 9–11.

Figure 7:
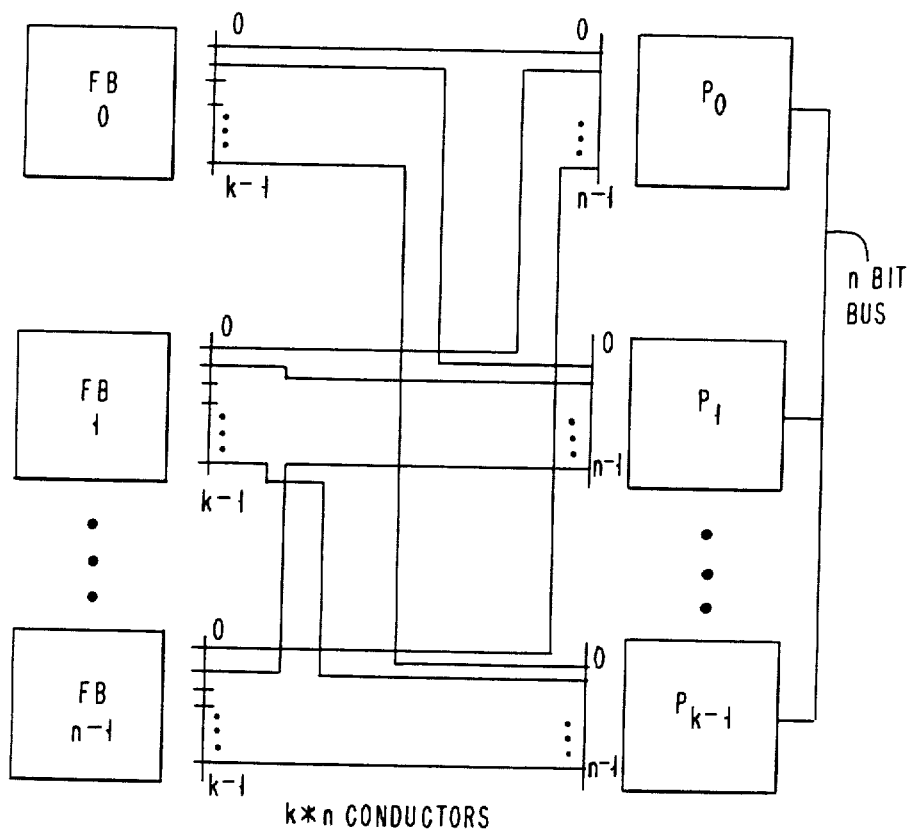
FIGS. 7 and 8 illustrate prior art pixel processor architecture.
Figure 8:
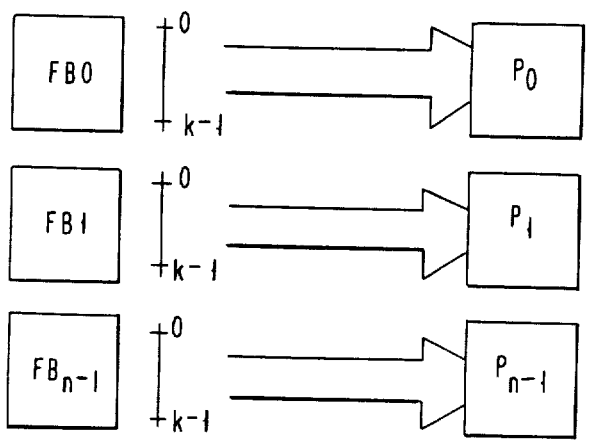

Before describing this embodiment of the invention in detail, reference is first made to FIGS. 7 and 8 to illustrate prior art graphic processors and their shortcomings which are overcome by the invention. FIG. 7 shows an arrangement of n memory planes (FB0–FBn−1) wherein each memory plane has a k-bit word. Thus a single access provides us with k n-bit pixels, which are accessed in parallel by the k processing elements P0–Pk−1. The n-bit bus shown interconnecting each of the pixel processors P0–Pk−1 (at the right) provides interpixel communication for the n-bit pixels. FIG. 7 requires k * n external connections between the memory and the processors and inhibits us from extending the pixel length. The only way pixel length can be extended in FIG. 7 is by replacing each of the pixel processors P0–Pk−1 so that their capacity can be increased.

FIG. 8 shows the SUN display architecture. This architecture is oriented for images comprising single bit pixels, providing parallel computations of data stored in different bit planes, or in the same bit plane. By simultaneously operating the processors P0–Pn−1, calculations can be effected on several pixels simultaneously, and because of the single bit nature of the pixels, simultaneous pixel operations can be effected by a single one of the processors. On the other hand, image modifications which require pixel value calculations must be done by the host processor in the slow sequential mode. Extending bit length, in this architecture is not restricted, and can be increased by simply adding extra bit plane memories and processing elements.

Figure 9:
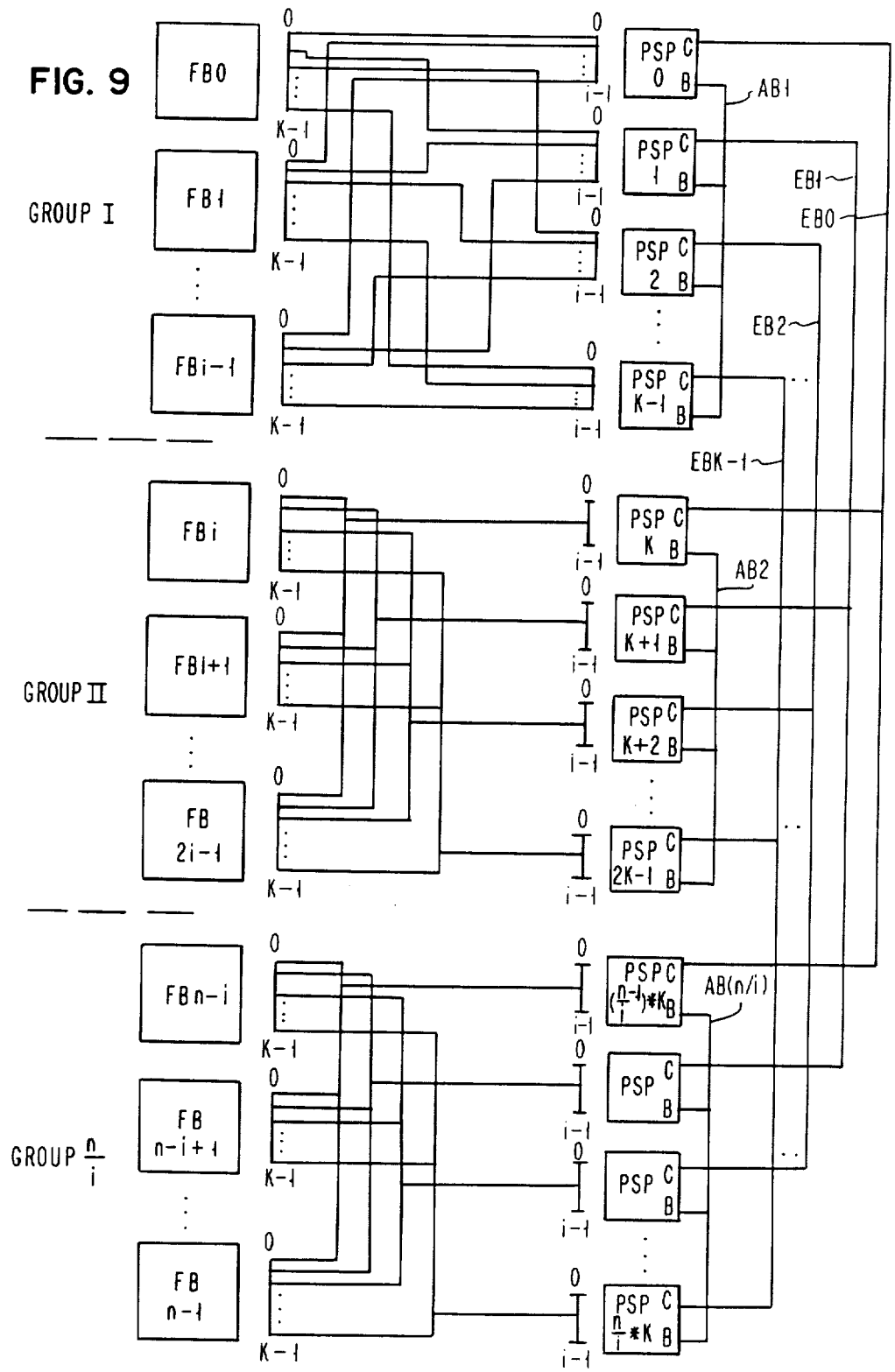
FIG. 9 is a block diagram of a pixel processor architecture in accordance with the second embodiment of the invention.

The pixel processor shown in FIG. 9, however, provides a graphic processor which can be easily expanded in pixel length but at the same time array processing of pixel data as well as parallel interplane calculations can be provided.

Referring now to FIG. 9, the frame buffer is represented by n memory planes (FB0–FBn−1) with a k-bit word in each memory plane. The n memory planes are grouped including i planes per group. A plurality of pixel slice processors (PSP0, PSP1, etc.) is also provided which are also grouped, so that there is a group of pixel slice processors for each group of frame buffer planes. Each of the pixel slice processors can handle i bit words and there are k pixel slice processors per group. Each processor in a group handles a portion of a different pixel. With n bits per pixel, and each processor handling i bits, we need n/i processors per pixel, and since we are processing k pixels in parallel, we have a total of k * (n/i) processors.

To provide for bidirectional data flow between the pixel slice processors and frame buffer planes in the associated group, a bidirectional data path is provided which has, for each group, k * i conductors to provide for bit parallel data transfer. As shown in FIG. 9, the k conductors coupled to FB0 are coupled to the zero bit position of each of the pixel slice processors in the associated group. Each of the k output bits from FB1 is likewise coupled to the unity bit position of each of the k pixel slice processors in the group. Thus a k-bit word read from FB0 provides a single bit for each of the pixel slice processors in the group. When all the frame buffers are accessed in parallel, the k * i bits read out of the frame buffers FB0–FBi−1 provide i bits of data for each of the k pixel slice processors in the group. The same arrangement is repeated for each of the other groups.

In order to provide for intrapixel and interpixel communications, so as to handle conditional processing and carries within a pixel, the pixel slice processors are interconnected, one with another through two additional data paths. Each group includes a data path AB (for intragroup communication). Thus there is an AB1 data path, an AB2 data path and an AB(n/i) data path. Each of these data paths is i bits in width and is coupled to the pixel slice processor through a B port. Each of the pixel slice processors also include a C port.

A different data path (EB) is provided for intergroup communications. The EB data path interconnects corresponding pixel slice processors in different groups. Thus, for example data path EB0 interconnects the 0 order pixel slice processor of each group (PSP0, PSPk, PSP2k, etc.). This data path comprises a group of i conductors, one conductor for each bit. A similar data path EB1 connects the (unit order) pixel slice processors PSP1, PSP k+1, PSP 2k+1, etc. through corresponding C ports on each of these pixel slice processors. Similar i-bit data paths, EB2, etc. through EB k−1 are provided.

Since corresponding pixel slice processors in different groups are operating on different portions of a common pixel, the data paths EB0-EB k−1 provide for intrapixel carries.

On the other hand, different pixel slice processors in the same group are operating on different pixels and thus the data paths AB1−AB(n/i) provide for interpixel communication.

An efficient implementation of the architecture of FIG. 9 is provided by placing each different group (of pixel slice processors and perhaps the corresponding frame buffers) on a separate circuit board. In accordance with this implementation the intragroup buses do not cross circuit board boundaries. The intergroup buses (EB0-EB k−1) are connected to each board, however, the number of conductors in this bus and their connection to the boards is independent of the pixel length n and therefore extending the bit length of a pixel can be effected by simply adding a new board or boards.

The architecture in FIG. 9 does not pay a speed penalty for inter- or intrapixel calculations. The architecture of FIG. 9 also has an advantage over the architectures of FIGS. 7 or 8 especially if the pixel length n is greater than the data path in FIG. 7 or 8, since in that case the architecture of FIG. 7 or 8 requires repetitive memory accesses, whereas the architecture of FIG. 9 need never operate with a pixel length which requires more than a single memory access.

The architecture of FIG. 9 can be implemented with any bit slice processor, e.g. Am2901. The pixel slice processor shown in FIG. 9. can also take the form of that shown in FIG. 2. More particularly, the ports B and C (of FIG. 9) are connected to a tridirectional transceiver (in lieu of the bidirectional transceiver BT of FIG. 2).

Figure 10:
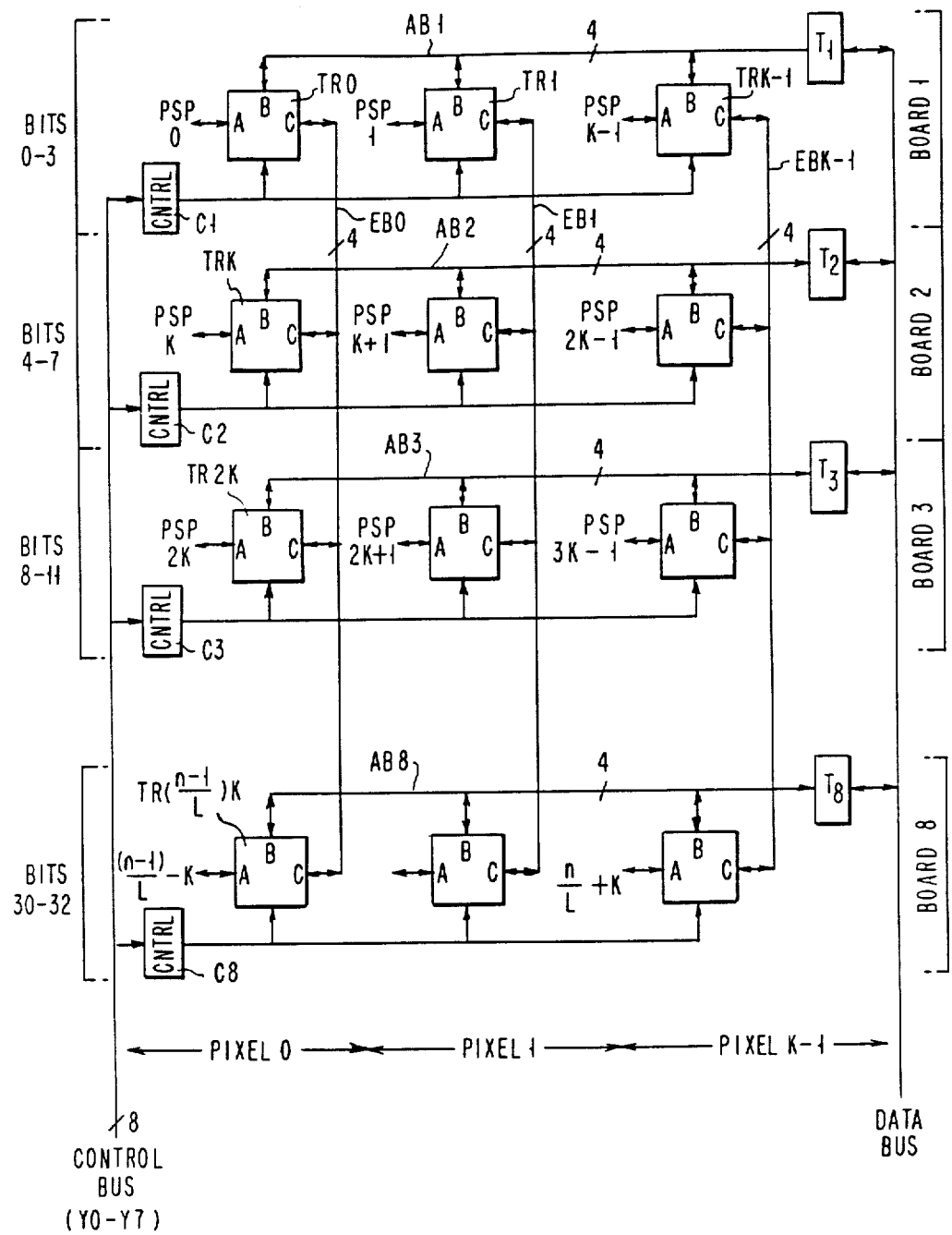
FIG. 10 is a block diagram illustrating an efficient implementation of interpixel processor communication in accordance with the second embodiment of the invention.

FIG. 10 is an implementation of the intra- and intergroup communication network. FIG. 10 identifies 8 different circuit boards (groups). If each group handles four bits (i=4), then a 32-bit pixel can be handled. In one embodiment of the invention 16 pixels were handled in parallel (k=16). FIG. 10 omits the frame buffers and the pixel slice processors and the associated interconnections, but does illustrate implementation of the buses EB0-EB k−1 and AB1-AB(n/i). More particularly, to implement the two bus (intra-group and intergroup buses) structure, the processor of FIGS. 9/10 uses tridirectional but transceivers TR0, TR1, etc. which can be 74 LS 442. An A port of each transceiver, TR1, etc. is connected to the associated pixel slice processor, e.g. the bus B and latch LA (FIG. 2). In other words, the tri-directional transceivers TR replace the bidirectional transceivers BT of FIG. 2. The B port of each of the tridirectional transceivers on the board (group) is connected to the associated AB bus. The C port of each of the transceivers is connected to one of the eternal buses EB0, EB1, etc. and implements bus structure of the same designation in FIG. 9. A host data bus 50 is coupled to an additional transceiver on each board, e.g. T1, T2, etc. Each of the transceivers T1-T8 is connected to the associated AB bus on the board. Each board includes in addition a control C. Thus we have control C1-C8, one for each of boards 1-8. A control bus (eight bits wide) provides control signals Y0-Y7 for each of the controls C1-C8. The control C can be implemented as field programmable logic arrays 8 2S 153. Thus as shown in FIG. 10. board 1 handles bits 0-3, board 2 handles bits 4-7, through board 8 handling bits 30-32. The low order position on each board handles a first pixel (pixel 0), the next order position on each board handles the next pixel (pixel 1) through the last position on each board handling pixel k−1.

FIG. 11 is one example of bit assignments for the controls C1-C8. The control signals establish four distinct conditions, e.g. both buses are disabled, bus AB is enabled to write from a specified pixel (pixel j), bus AB is enabled to copy any or all pixels from the host data bus 50, or bus EB is enabled with a specified 4-bit pixel portion constituting the source. More particularly, in the condition 00 (bits 8 and 7, respectively), all buses are disabled. In condition 01, the AB bus is enabled and bits 0-3 identify the pixel which is the source from which the other pixels are written. That is in the condition 01 the transceiver associated with the source pixel acts as a transmitter through its B port, the other transceivers receive from the bus AB through their B port. In condition 10, the EB bus is enabled and bits 4-6 identify a 4-bit pixel portion which are the source from which the other pixel portions are written. That is, the transceiver associated with bits 4M to 4M+3 acts as a transmitter through its C port and the other transceivers coupled to the EB bus act as receivers through their C ports. Finally, in the condition 11, the AB bus is enabled to receive from the host data bus. That is, all transceivers receive from the AB bus through their B ports.

Figure 13:
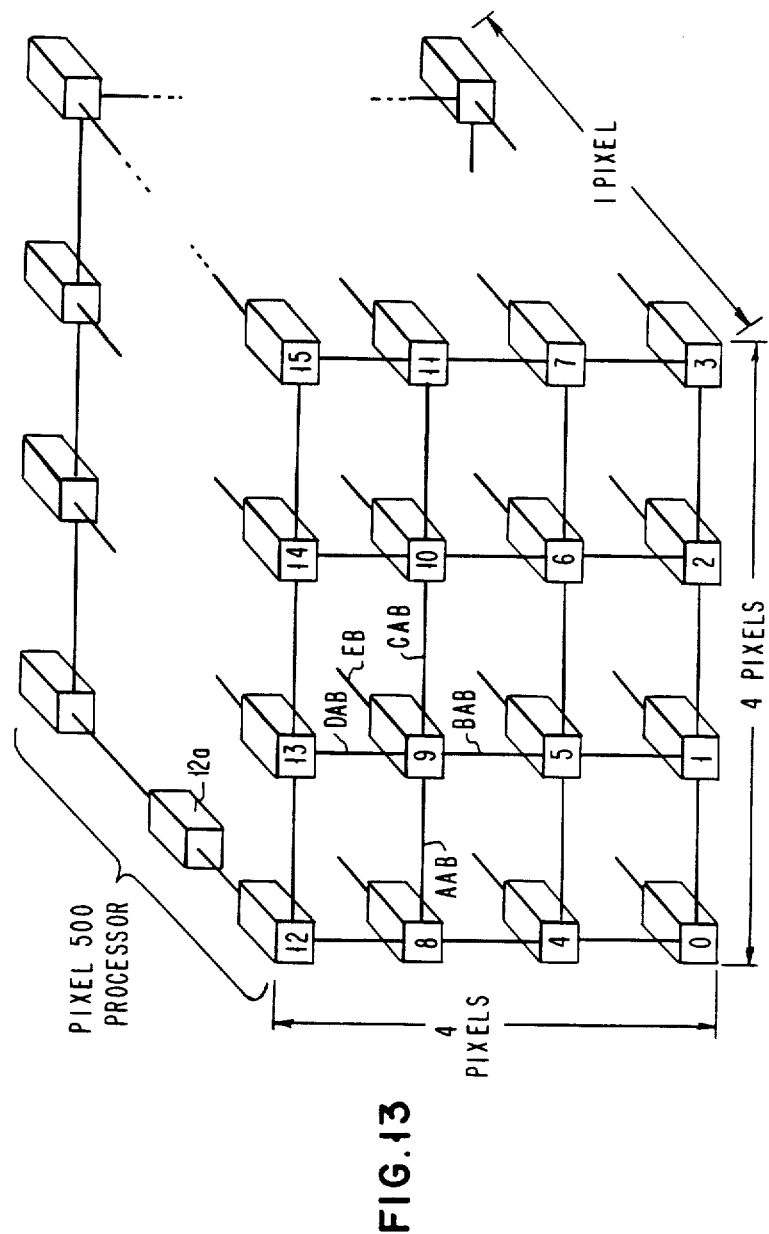
FIG. 13 is a variation of the second embodiment of FIGS. 9/10.

FIGS. 9/10 are convenient if the pixel neighborhood is along a scan line, for example, if the 16 pixels processed simultaneously are along a scan line. However, other neighborhoods are also conventional. Assume the simultaneously processed 16 pixels are in the form of a 4×4 array. In this case the AB bus (interpixel bus) can be used to deliver pixel data to other selected pixels. If several pixels are to be transmitted, successive operations are required since there is only a single intragroup bus. The architecture of FIGS. 9/10 can be expanded and improved for the 4×4 array in FIG. 13 illustrating a pixel processor 500. Here the tri-directional transceivers TR1, etc. are replaced by five port transceivers, ETR0, etc. One port (coupled to the EB bus) is used for intrapixel communication. Up to four other ports are each dedicated to a different one of up to four buses which replace the AB bus. These buses are, for typical PSP 9, AAB (connected to PSP 8), BAB (connected to PSP 5), CAB (connected to PSP 10), and DAB (connected to PSP 13). Thus data transfer from PSP 9 to PSP 13 can be simultaneous with transfer from PSP 5 to PSP 9. Clearly, there are other arrangements for connecting the array which have different advantages and disadvantages.

Having thus described my invention, what I claim as new, and desire to secure by Letters Patent is:

1. A graphic processor for single instruction multiple data operations on k pixels simultaneously, each pixel having at most n bits, where k and n are integers each greater than one, which processor is also easily expandable in terms of pixel length and can efficiently handle conditional operations requiring efficient interpixel communications comprising:
   a plurality of n frame buffers, each buffer storing data of k bit width, said plurality of frame buffers arranged in groups of i frame buffers per group, where n and i are each integers greater than one and i is an integer less than n to provide n/i groups of frame buffers, a plurality of pixel slice processors, each operating on data of i bit width, said plurality of pixel slice processors arranged in n/i groups of k processors per group where each frame buffer group has a corresponding pixel slice processor group, data path means to provide for:
  (i) bidirectional, bit-parallel data flow within a group between said frame buffers and said pixel slice processors,
  (ii) data flow between pixel slice processors of a group, and
  (iii) data flow between corresponding pixel slice processors of different groups,
said data path means providing bidirectional, bit parallel data flow within a group including connections between each pixel slice processor and each frame buffer where each frame buffer of a group is connected only to pixel slice processors of that group,
whereby computations requiring intra pixel carries and conditional computations requiring inter pixel communications are provided for on said data path means and extensions of pixel length are handled by increases in the integer n.

2. The processor of claim 20 in which said data path means comprises:
  a first set of data paths in each group coupling first i/o ports of said pixel slice processors to i/o ports of said frame buffers, a second set of data paths for intra group communication coupling second i/o ports of pixel slice processors in a group to each other to provide for inter pixel data communication, and
  a third set of data paths for inter group communication coupling third i/o ports of corresponding pixel slice processors in different groups to provide for intra pixel data communication.

3. The processor of claim 2 in which said first set of data paths in each group includes k*i bidirectional data paths, arranged in groups of i conductors, each group of i conductors coupling one of said k pixel slice processors to said i frame buffers of a group.

4. The processor of claim 1 which further includes:
  a plurality of circuit boards, one for each group, in which each of said groups of pixel slice processors are located on a different one of said circuit boards, and an inter board bus to provide that portion of said data path means for data flow between corresponding pixel slice processors of different groups.

5. The processor of claim 1 which further includes a tri-port transceiver for each pixel slice processor, a first port coupled to bus internal to the associated pixel slice processor, a second port coupled over a portion of said data path means to transceivers associated with different pixel slice processors within a group and a third port coupled to transceivers associated with corresponding pixel slice processors in different groups.

6. The processor of claim 1 which further includes a five port transceiver for each pixel slice processor, a first port coupled over a bus in said data path means to transceivers associated with corresponding pixel slice processors in different groups, and second through fifth ports coupled to transceivers associated with different pixel slice processors within a group.

7. The graphic processor of claim 1 in which each of said pixel slice processors includes:
  source and destination operand registers each of n-bit length and each coupled to said data path means and therethrough to an associated frame buffer,
  a digital memory with an input from each of said operand registers responsive to addressing inputs from said operand registers to produce n-bit output data,
  a data latch responsive to said n-bit output data of said digital memory, and
  connecting means coupling said data latch to said data path means and therethrough to other pixel slice processors in said pixel processor.

8. The graphic processor of claim 7 wherein each of said pixel slice processors further includes:
  a second source and second destination register each of n-bit length and each coupled to said data path means, source and destination multiplexers each connected between said digital memory said source and second source regsters and said destination and second destination registers, respectively.

9. The graphic processor of claim 7 wherein each of said pixel slice processors further includes:
  a second source and second destination register each of n-bit length and each coupled to said data path means, source and destination multiplexers and source and destination AND gates, said source AND gate coupled between said source and second source registers and said source multiplexer, said destination AND gate coupled between said destination and second destination registers and said destination multiplexer, said source and destination multiplexers each connected to said digital memory.

10. The graphic processor of claim 7 which further includes:
  a transceiver coupled between said data latch and said digital memory, said transceiver having a first port coupled to said digital memory and a second port coupled in common to said data latch and a host data bus.

11. The graphic processor of claim 10 in which said digital memory comprises a R/W random access memory means for providing an output to said data latch through said transceiver and responsive to data provided through said transceiver from said host data bus.

* * * * *

UNITED STATES PATENT AND TRADEMARK OFFICE
CERTIFICATE OF CORRECTION

PATENT NO. : 4,860,248

DATED : Aug. 22, 1989

INVENTOR(S) : Lumelsky

It is certified that error appears in the above-identified patent and that said Letters Patent is hereby corrected as shown below:

Col. 6, line 1, after "PSP" insert -bus. The direction of data flow through the bidirectional-; delete "directional".

Col. 9, line 6, change ". The" to -, the-.

Col. 13, line 53, change "but" to -bus-;

line 62, change "eternal" to -external-;

line 68, change "control" to -controls-.

Col. 15, line 28, change "20" to -1-;

line 55, change "to bus" to -to a bus-.

Col. 16, line 31, change "regsters" to -registers-.

Signed and Sealed this

Fourth Day of December, 1990

Attest:

HARRY F. MANBECK, JR.

*Attesting Officer*    *Commissioner of Patents and Trademarks*